US010372661B1

(12) United States Patent
Hoffmann

(10) Patent No.: US 10,372,661 B1
(45) Date of Patent: Aug. 6, 2019

(54) FIRMWARE DEBUG TRACE CAPTURE USING SERIAL PERIPHERAL INTERFACE

(71) Applicant: American Megatrends, Inc., Norcross, GA (US)

(72) Inventor: Matthew Hoffmann, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 187 days.

(21) Appl. No.: 15/444,943

(22) Filed: Feb. 28, 2017

(51) Int. Cl.
*G06F 11/36* (2006.01)
*G06F 13/36* (2006.01)
*G06F 13/42* (2006.01)
*G06F 13/40* (2006.01)
G06F 9/4401 (2018.01)
G06F 8/61 (2018.01)

(52) U.S. Cl.
CPC ...... *G06F 13/4282* (2013.01); *G06F 11/3636* (2013.01); *G06F 13/36* (2013.01); *G06F 13/4072* (2013.01); *G06F 8/61* (2013.01); *G06F 9/4401* (2013.01)

(58) Field of Classification Search
CPC .. G06F 13/4282; G06F 11/3636; G06F 13/36; G06F 13/4072
USPC .......................................................... 710/105
See application file for complete search history.

(56) References Cited

U.S. PATENT DOCUMENTS

| 6,289,448 | B1* | 9/2001 | Marsland | G06F 9/4401 713/2 |
| 7,055,070 | B1* | 5/2006 | Uhler | G06F 11/3636 714/25 |
| 2005/0183069 | A1* | 8/2005 | Cepulis | G06F 11/3636 717/128 |
| 2009/0077365 | A1* | 3/2009 | Masuyama | G06F 9/4403 713/2 |
| 2013/0339718 | A1* | 12/2013 | Kanaya | G06F 11/22 713/2 |
| 2016/0077905 | A1* | 3/2016 | Menon | G06F 11/3648 714/37 |
| 2017/0286254 | A1* | 10/2017 | Menon | G06F 11/364 |

* cited by examiner

*Primary Examiner* — Christopher B Shin
(74) *Attorney, Agent, or Firm* — Newport IP, LLC Shigeta | Hope

(57) ABSTRACT

Debug trace statements from a firmware are captured during a boot cycle of a computer executing the firmware. The debug trace statements are written to a motherboard's Serial Peripheral Interface ("SPI") device. A microcontroller's SPI device receives the debug trace statements from the motherboard's SPI device, transforms the data format of the debug trace statements, and transmits the transformed debug trace statements over a serial communications port of the microcontroller.

20 Claims, 6 Drawing Sheets

FIRMWARE DEBUG TRACE CAPTURE USING SERIAL PERIPHERAL INTERFACE

BACKGROUND

A computer can include firmware that performs initialization of the computer's hardware during the boot process of the computer. The firmware can also load and perform setup operations for the operating system of the computer. The firmware can be implemented in a read-only memory ("ROM") affixed to the motherboard of the computer. A computer can also include, or be attached to, one or more devices such as video cards, displays, disk drives, and input/output devices such as a keyboard, for example. The devices can be on-board devices directly attached to the motherboard. The devices can also be add-on devices that are connected to the motherboard via slots (e.g., a PCI card slot) or connected to the motherboard via a USB port, as just some examples.

During firmware development and testing, firmware developers may include code that generates debug trace statements providing information regarding the state of the firmware when executed or providing information that execution of the firmware reached a point of interest, such as the entry or exit of a function. In some traditional testing environments, the debug trace statements are output to a display via a video card connected to the computer executing the firmware, and firmware developers can watch the video display to view and analyze the debug trace statements. In some traditional testing environments, the debug trace statements are output to a peripheral device (e.g., a printer) via a serial communications port, such as a RS-232 port.

Some embedded computing systems having firmware do not have video cards, displays, or serial communications ports for interfacing peripheral devices with the computing systems. In addition, some computing systems used for testing firmware may have defective and/or inoperative video cards, displays, and/or serial communications ports. Testing of such computing systems using debug trace statements can be difficult as the traditional methods for outputting the debug trace statements are not available.

SUMMARY

Technologies are described herein for providing debug trace capture for computer system firmware. Through implementation of the disclosed technologies developers can capture debug trace statements while testing firmware for output limited computing systems lacking functional video capabilities or serial communication ports.

In some configurations, the disclosed technologies offer a technical solution for capturing debug trace statements in output limited systems by redirecting debug trace statements to a serial peripheral interface ("SPI") bus connected to a microcontroller. Once received by the microcontroller, the debug trace statements can be output to a display or a COM port, such as a RS 232 compliant serial port.

In one aspect, a computer system includes a motherboard connected to a microcontroller via a SPI bus. The motherboard has a first processor and a first SPI device. The first processor captures debug trace statements from the motherboard's firmware during a boot cycle of the computer system. The debug trace statements are encoded into a first data format and written to the first SPI device. The microcontroller has a second processor, a second SPI device, and a serial communications port. The second processor captures the debug trace statements in first data format from the first SPI device, converts the captured debug trace statements to a second data format and transmits the converted debug trace statements over the serial communications port.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for debug trace capture in a computer system firmware using a SPI bus. As discussed briefly above, through an implementation of the technologies disclosed herein, debug trace capture for a firmware can be routed from a traditional output (e.g., a video card serial port) to a SPI bus. An SPI slave, such as a microcontroller, can capture the debug trace statements and transform them into a data format capable of being transmitted via a serial port. The disclosed configurations may be used when traditional output using video cards or communications ports are not available. Additional details regarding these aspects will be provided below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
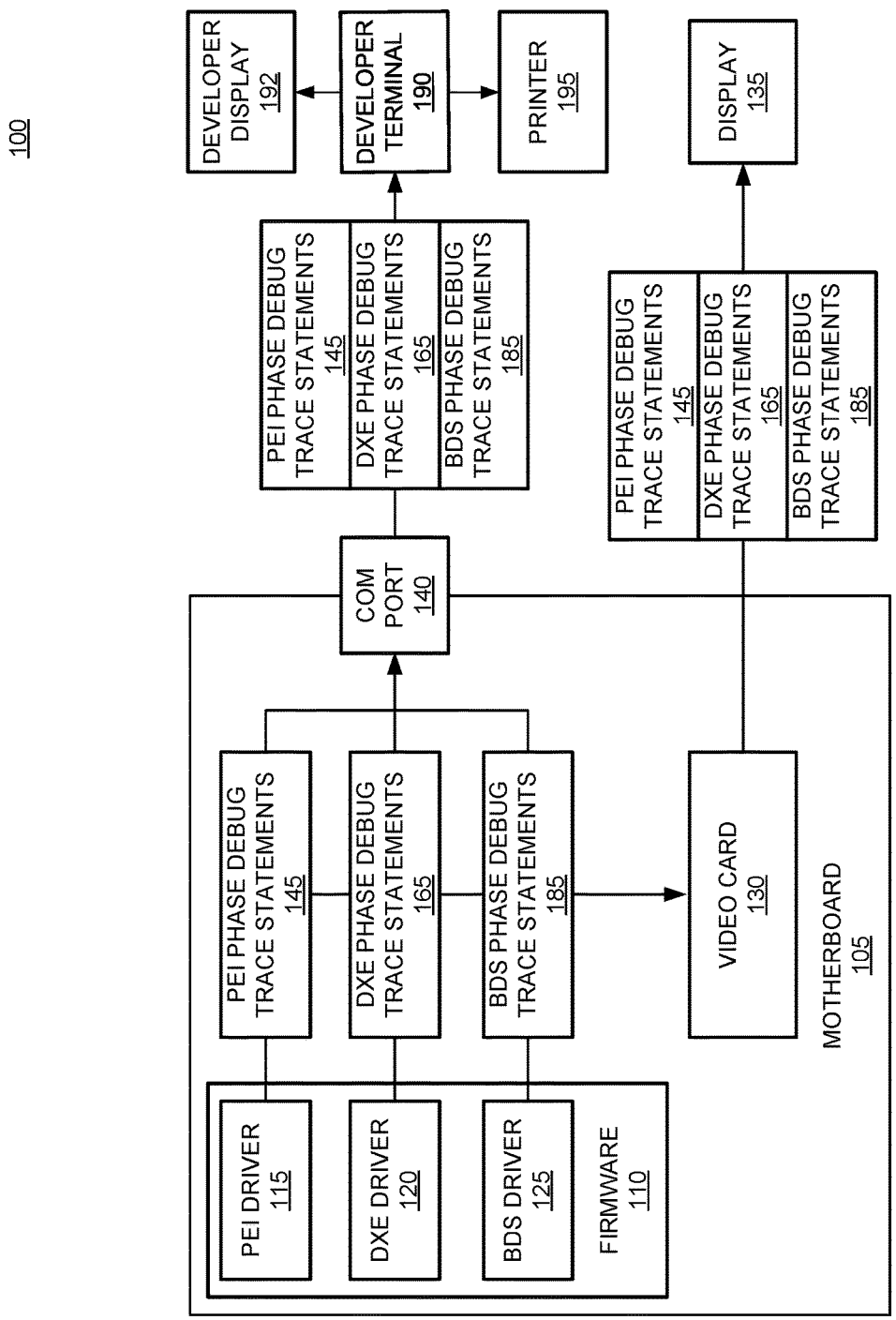
FIG. 1 is a block diagram of a configuration of a computer system using traditional debug trace capture techniques.

FIG. 1 is a block diagram of a configuration of a computer system 100 using traditional debug trace capture techniques. The computer system 100 can include a motherboard 105. The motherboard 105 can include a firmware 110, a video card 130, and a COM port 140, among other components. For example, the computer system 100 can include the components described below with respect to FIG. 6, below.

The firmware 110 can include one or more software modules or components that provide control and monitoring of the computer system 100 or can provide manipulation of data accessible by the computer system 100. The firmware 110 can include Basic Input/Output System ("BIOS") firmware or Unified Extensible Firmware Interface ("UEFI") compliant firmware for a computing system. The firmware can also include, for example, embedded system firmware.

The video card 130 can include, for example, an expansion card that generates output streams for rendering on a video display, such as the display 135 of FIG. 1, and can include a graphics processor, a heat sink, a specialized video BIOS or option read-only memory (option ROM), and/or an analog to digital converter, in some configurations.

The COM port 140 can include a port used to connect the motherboard 105 with external devices or computer systems. For example, as shown in FIG. 1, the COM port 140 can be used to connect the motherboard 105 with a developer terminal 190. The COM port 140 can be a serial port in some configurations, such as a port compliant with the RS-232 standard.

According to some configurations, the firmware 110 can include various drivers that perform functions and operations during the boot cycle of the computer system 100. In some configurations, the firmware complies with the UEFI standard and the firmware can include one or more drivers corresponding to the boot cycle specified in the UEFI standard. For example, as shown in FIG. 1, the firmware 110 can include a pre-EFI initialization ("PEI") driver 115 that performs functions and operations consistent with the PEI phase of the UEFI boot cycle, a driver execution environment ("DXE") driver 120 that performs functions and operations consistent with the DXE phase of the UEFI boot cycle, and a boot device selection ("BDS") driver 125 that performs functions and operations consistent with the BDS phase of the UEFI boot cycle.

Although FIG. 1 shows each of the PEI driver 115, the DXE driver 120, and the BDS driver 125 as singular components, in some configurations, each of the PEI driver 115, the DXE driver 120, and the BDS driver 125 may contain multiple components or subcomponents. While this disclosure may reference operations and functionality as being performed by one of the PEI driver 115, the DXE driver 120, and the BDS driver 125, such functionality may be performed by another of the PEI driver 115, the DXE driver 120, and the BDS driver 125 in some configurations.

The source code for the firmware 110 can include code used for debugging purposes. The debugging code can include instructions for generating information about the current state of execution for the computer system 100 such as function entry and/or exit, that a current line of code is being executed, or product output of one more variables. The code can be, for example, a function call to print a string to a display or standard output of the computer system 100, generate a graphic, or change the state of an output device. In some configurations, the source code of firmware 110 incorporates functions or methods for printing a string or value to a display, similar to the printf function available in the C programming language.

As shown in FIG. 1, each of the PEI driver 115, the DXE driver 120, and the BDS driver 125 may generate PEI phase debug trace statements 145, DXE phase debug trace statements 165 and BDS phase debug trace statements 185, respectively. Each of the PEI phase debug trace statements 145, the DXE phase debug trace statements 165, and the BDS phase debug trace statements 185 can include debug trace statements corresponding to their respective phase such as statements related to function entry or exit, execution of a line of code, entry from one phase to another, or variable values. The PEI phase debug trace statements 145, the DXE phase debug trace statements 165 and the BDS phase debug trace statements 185 can provide information to developers when testing the motherboard 105 and/or firmware 110 to assist in addressing errors or faults.

In a traditional debugging environment, the PEI phase debug trace statements 145, the DXE phase debug trace statements 165, and the BDS phase debug trace statements 185 may be sent to the video card 130 and/or the COM port 140. When sent to the video card 130, the PEI phase debug trace statements 145, the DXE phase debug trace statements 165 and the BDS phase debug trace statements 185 may be rendered on the display 135. When sent to the COM port 140, the PEI phase debug trace statements 145, the DXE phase debug trace statements 165 and the BDS phase debug trace statements 185 may be received by a developer terminal 190 which may either display the PEI phase debug trace statements 145, the DXE phase debug trace statements 165, and the BDS phase debug trace statements 185 on the developer display 192 or print the PEI phase debug trace statements 145, the DXE phase debug trace statements 165 and the BDS phase debug trace statements 185 using the printer 195. Although not shown in FIG. 1, computing devices other than the developer terminal 190 may receive the PEI phase debug trace statements 145, the DXE phase debug trace statements 165 and the BDS phase debug trace statements 185 and display and/or print them via the COM port 140.

Figure 2:
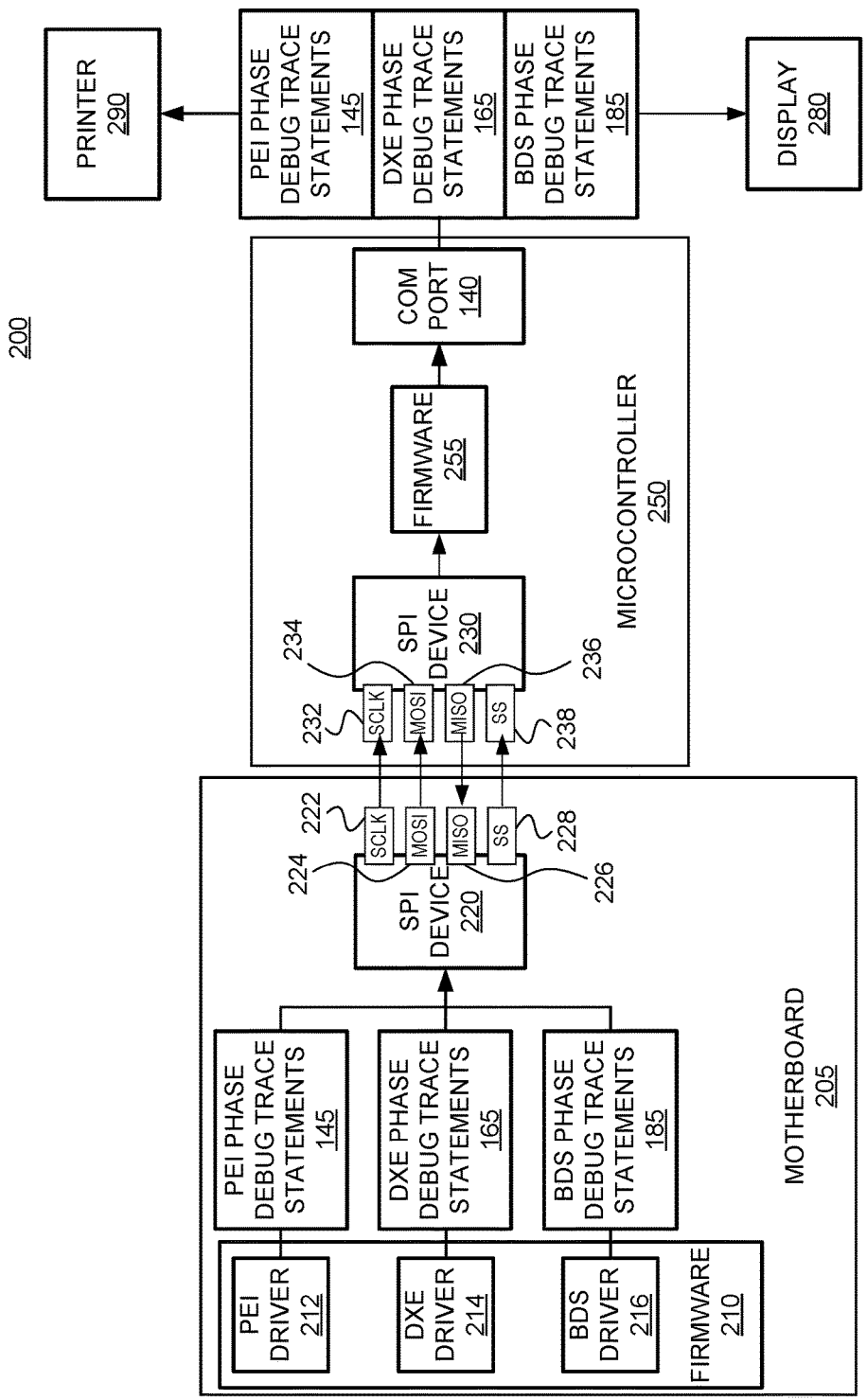
FIG. 2 is a block diagram of a configuration of a computer system for capturing firmware debug trace statements using a SPI bus.

FIG. 2 is a block diagram of a configuration of a computer system 200 for capturing firmware debug trace statements using a SPI bus. The computer system 200 includes a motherboard 205, a microcontroller 250, a display 280, and a printer 290. Unlike the motherboard 105 illustrated in FIG. 1, the motherboard 205 does not have an on-board video card or COM port. As the motherboard 205 does not include an operative video card or COM port, traditional debug trace capture techniques are not available. To address the inability of the motherboard 205 to capture debug trace statements using traditional techniques, consistent with disclosed configurations, the firmware 210 of the motherboard 205 reroutes debug trace statements, such as the PEI phase debug trace statements 145, the DXE phase debug trace statements 165 and the BDS phase debug trace statements 185 to an on-board SPI device 220 as opposed to a video card or COM port.

Similar to the source code for the firmware 110 discussed above, the source code for the firmware 210 can include code used for debugging purposes. The debugging code can include instructions for generating information about the current state of execution for the computer system 200 such as function entry and/or exit, that a current line of code is being executed, or output for the value of one more variables. The code can be, for example, a function call to print a string, generate a graphic, or change the state of an output device.

In some configurations, the source code of firmware 210 incorporates functions or methods for printing a string or value to a display, similar to the printf function available in the C programming language. But, instead of printing a string of characters to a display or standard output of the computer system 200 such as a video card or COM port, the PEI driver 212, the DXE driver 214, and the BDS driver 216 may make a call to a library that redirects a string of characters to the SPI device 220.

In some configurations, the library to which the PEI driver 212, the DXE driver 214, and the BDS driver 216 is overridden or rewritten to redirect strings from a traditional output (e.g., a video card or COM port) is written/directed to the SPI device 220. In such configurations, the PEI driver 212, the DXE driver 214, and the BDS driver 216 may make calls to print the PEI phase debug trace statements 145, the DXE phase debug trace statements 165, and the BDS phase debug trace statements 185 without having to know or having to specify the output mechanism (e.g., video card, COM port, and/or SPI device).

According to some configurations, the firmware 210 encodes the PEI phase debug trace statements 145, the DXE phase debug trace statements 165, and the BDS phase debug trace statements 185 into a first data format that provides for effective transmission over an SPI bus, or that is consistent with the SPI specification. For example, the firmware 210 may format the PEI phase debug trace statements 145, the DXE phase debug trace statements 165, and the BDS phase debug trace statements 185 into 8-bit words in big endian format. In some configurations, the first data format can include a standard character encoding such as American Standard Code for Information Interchange ("ASCII") or UTF-8. In some configurations, the first data format can include a non-standard character encoding customized for debug trace capture implementations. In such configurations, a firmware 255 of the microcontroller 250 may perform functions and operations for decoding the non-standard character encoding.

As shown in FIG. 2, the SPI device 220 of the motherboard 205 is connected to the SPI device 230 of the microcontroller 250. In some configurations, such as the configuration shown in FIG. 2, the SPI device 220 acts as a master and the SPI device 230 acts as a slave in the SPI architecture, although in other configurations, the SPI device 230 may act as the master and the SPI device 220 may act as the slave. Consistent with the SPI specification, the SPI device 220 has four port pins: a clock pin ("SCLK") 222, a master-out slave-in pin ("MOSI") 224, a master-in slave-out pin ("MISO") 226, and a slave select pin ("SS") 228. Likewise, the SPI device 230 has four port pins: a clock pin ("SCLK") 232, a master-out slave-in pin ("MOSI") 234, a master-in slave-out pin ("MISO") 236, and a slave select pin ("SS") 238. The pins 222, 224, 226, 228 of the SPI device 220 are connected to the corresponding pins 232, 234, 236, 238 of the SPI device 230.

The SPI device 220 and the SPI device 230 have each have corresponding shift registers. The shift registers can be 8-bits in some configurations, but shift registers of other bits are possible in other configurations. Data is sent from SPI device 220 (acting as master) to SPI device 230 (acting as slave) via the MOSI pin 224 by shifting bits loaded into the shift register of the SPI device 220 to the shift register of the SPI device 230.

In some configurations, the firmware 210 encodes or transforms the PEI phase debug trace statements 145, the DXE phase debug trace statements 165, and the BDS phase debug trace statements 185 by encoding them into words of the same size as the shift register of the SPI device 230. The words are transmitted by loading each word into the shift register of the SPI device 230. During each clock cycle, the SPI device 220 shifts its data—containing the PEI phase debug trace statements 145, the DXE phase debug trace statements 165, and the BDS phase debug trace statements 185—over the MOSI pin 224 to the SPI device 230 via the MOSI pin 234.

Likewise, during each clock cycle, the SPI device 230 shifts its data via the MISO pin 236 to the SPI device 220 via the MISO pin 226. In some configurations, at the start of a clock cycle, the shift register of the SPI device 230 loads with a word containing all bits of a default value (e.g., 00000000 or 111111111 for an 8-bit register), and the most significant bit the shift register of the SPI device 230 are shifted out via the MISO pin 236 and into the least significant bit of the shift register for the SPI device 220 via the MISO pin 226 and the MISO pin 236. Once the firmware 210 detects that the word loaded into the shift register of SPI device 220 is complete (e.g., it detects that the default word is loaded in the shift register for SPI device 220), it may load the next word.

In some configurations, as the debug trace statements in the first data format are being sent from SPI device 220 to SPI device 230, the MISO pin 226 of the SPI device 220 and the MISO pin 236 of SPI device 230 may not be used. In such configurations, bits may be shifted out of the shift register for SPI device 220 shifting the most significant bit first, and a default value (such as 0) may be shifted into the least significant bit of the shift register of the SPI device 220 by the firmware 210 until a clock cycle is complete (e.g., the shift register is loaded with all of the default value).

As the SPI device 230 receives the PEI phase debug trace statements 145, the DXE phase debug trace statements 165, and the BDS phase debug trace statements 185 encoded in the first data format, the firmware 255 of the microcontroller 250 may transform them into a second data format that is suitable for transmission over the COM port 260 of the microcontroller 250. The COM port 260 of the microcontroller 250 can include, for example, a serial communications port such as a RS-232 communications port or a USB communications port in some configurations.

In some configurations, the firmware 255 may transform the PEI phase debug trace statements 145, the DXE phase debug trace statements 165, and the BDS phase debug trace statements 185 from the first data format to the second data format by changing the endianness of the PEI phase debug trace statements 145, the DXE phase debug trace statements 165, and the BDS phase debug trace statements 185. For example, SPI devices typically send data encoded in big endian format while serial ports typically send data in little endian format, and the firmware 255 may transform the PEI phase debug trace statements 145, the DXE phase debug trace statements 165, and the BDS phase debug trace statements 185 accordingly.

In some configurations, the firmware 255 may transform the PEI phase debug trace statements 145, the DXE phase debug trace statements 165, and the BDS phase debug trace statements 185 in the first data format to a second data format by changing the encoding of the PEI phase debug trace statements 145, the DXE phase debug trace statements 165, and the BDS phase debug trace statements 185. For example, the first data format may be a non-standard data format used for debug trace capture specifically and the second data format may be ASCII or UTF-8, and the firmware 255 may transform the PEI phase debug trace statements 145, the DXE phase debug trace statements 165, and the BDS phase debug trace statements 185 accordingly.

In some configurations, the first data format and the second data format may be different standard formats. For example, the first data format may be ASCII and the second data format may be UTF-8 and the firmware 255 may transform the data accordingly. In some configurations, the COM port 260 may transmit data using a different number of data bits than the SPI device 220 and the SPI device 230. For example, the COM port may transmit data in 5-bit or 7-bit words, while the SPI device 220 and the SPI device 230 may transmit data using 8-bit words. In such configurations, the firmware 255 may transform the PEI phase debug trace statements 145, the DXE phase debug trace statements 165, and the BDS phase debug trace statements 185 accordingly.

After the firmware 255 transforms the PEI phase debug trace statements 145, the DXE phase debug trace statements 165, and the BDS phase debug trace statements 185 into the second data format, it may transmit them to a display 280 or a printer 290 via the COM port 260. Once transmitted to either the display 280 or the printer 290, the PEI phase debug trace statements 145, the DXE phase debug trace statements 165, and the BDS phase debug trace statements 185 may be accessible to developers for analysis.

Figure 3:
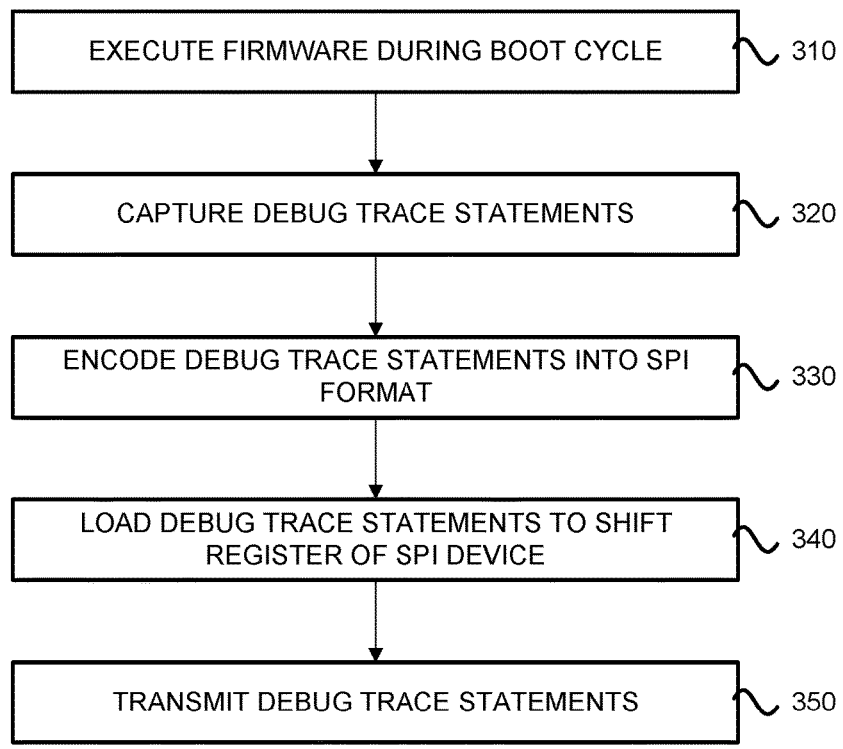
FIG. 3 is a flow diagram showing a routine for transmitting debug trace capture statements using a SPI bus consistent with disclosed implementations.

FIG. 3 is a flow diagram showing a debug trace transmission routine 300 for transmitting debug trace capture statements using a SPI bus consistent with disclosed configurations. It should be appreciated that the logical operations described with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified.

The debug trace transmission routine 300 begins at operation 310 where a computer system executes its firmware during its boot cycle. The firmware, as described above, can contain one or more drivers that perform functions and operations for booting the computer system, configuring hardware of the computer system, and loading the operating system of the computer system. In some configurations, the firmware can be UEFI complaint firmware and include drivers corresponding to a UEFI boot cycle, such as drivers for the PEI phase, the DXE phase, and the BDS phase of the UEFI boot cycle.

As noted above, the drivers of the firmware may output debug trace statements indicating an operation state or a variable value. At operation 320, the debug trace statements are captured. The captured debug trace statements can then be encoded into a first data format at operation 330. The first data format can be a format allowing the debug trace statements to be transmitted over an SPI bus. For example, encoding the debug trace statements may include formatting the debug trace statements into words of a bit length corresponding to the shift register of the SPI device of the computer system (e.g., 8-bits) or it may requiring ordering the bits of each word in big endian format.

Once the debug trace statements are encoded in the first data format, they can be loaded into the shift register of an SPI device of a computer, at operation 340. Once loaded, the debug trace statements may be transmitted by the SPI device consistent with disclosed configurations and the SPI specification, at operation 350. In some configurations, the SPI device is a master device and transmits the encoded debug trace statements over its MOSI pin to a connected slave SPI device.

Figure 4:
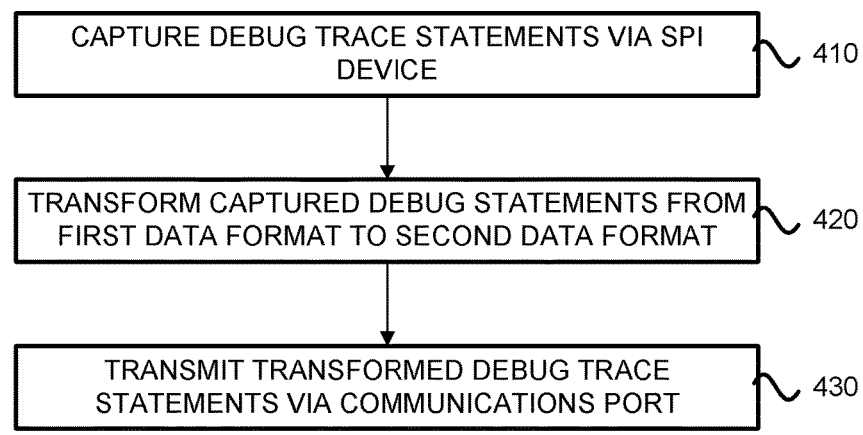
FIG. 4 a flow diagram showing a routine for capturing debug trace capture statements using a SPI bus consistent with disclosed implementations.

FIG. 4 is a flow diagram showing a debug trace capture routine 400 for capturing debug trace capture statements using a SPI bus consistent with disclosed configurations. Debug trace capture routine 400 can be performed by a microcontroller connected to a motherboard via a SPI bus, in some configurations.

The debug trace capture routine 400 begins at operation 410 where a microcontroller, using a SPI device connected to it, captures debug trace statements from an external SPI device, such as an SPI device connected to a motherboard. In some configurations, the SPI device of the microcontroller is acting as a slave in the SPI architecture and captures the debug trace statements via the MOSI pin of the SPI device.

Once the debug trace statements are captured, the microcontroller may transform them from a first data format into a second data format at operation 420. The data transformation may occur consistent with disclosed configurations. For example, the data transformation may change the endianness of the captured debug trace statements (e.g., from big endian to little endian), translate word size (e.g., 8-bit to 7-bit) or it may change the encoding of the captured debug trace statements (e.g., from a non-standard encoding to ASCII or UTF-8). In some configurations, the second data format is ASCII.

At operation 430, after transformation, the microcontroller may transmit the debug trace statements to another device via a communications port. The communications port may be, for example, a serial communications port, such as a RS-232 communications port. The communications port can also include other types of communications ports such as a USB port, and may not be limited to a serial communications port in some configurations.

Figure 5:
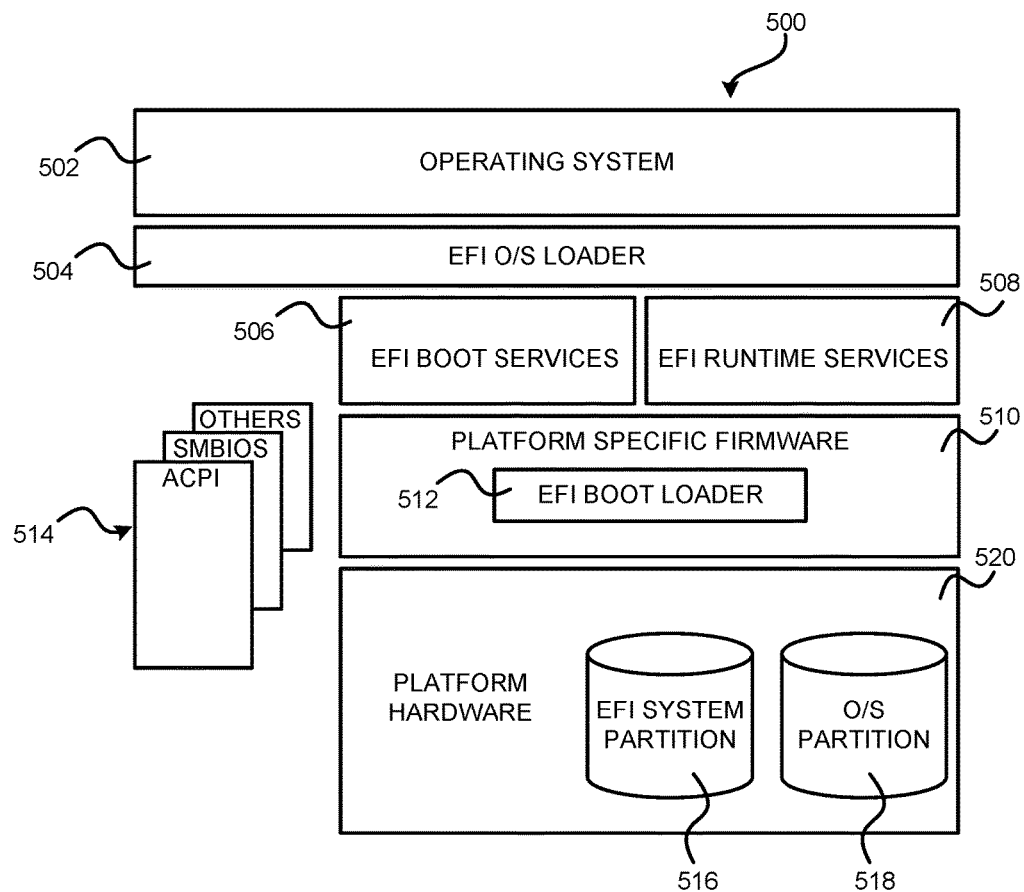
FIG. 5 is a software architecture diagram illustrating a software architecture for a Unified Extensible Firmware Interface ("UEFI") Specification-compliant firmware that provides an operating environment for the technologies presented herein in one particular configuration.

Turning now to FIG. 5, a software architecture diagram will be described that illustrates an architecture for a UEFI Specification-compliant firmware that can implement the technologies disclosed herein. The UEFI Specification describes an interface between an operating system 502 and a UEFI Specification-compliant firmware. The UEFI Specification also defines an interface that the firmware can implement, and an interface that the operating system 502 can use while booting. How the firmware implements the interface can be left up to the manufacturer of the firmware. The UEFI Specification also defines a way for the operating system 502 and firmware to exchange information necessary to support the operating system boot process. The term "UEFI Specification" used herein refers to both the EFI Specification developed by INTEL CORPORATION and the UEFI Specification managed by the UEFI FORUM.

As shown in FIG. 5, the architecture can include platform hardware 520 and an operating system 502. The operating system ("OS" or "O/S") image can be retrieved from the UEFI system partition 516 using an UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI OS loader 504 can continue to boot the complete operating system 502. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 506 can provide interfaces for devices and system functionality used during boot time. UEFI runtime services 508 can also be available to the UEFI OS loader 504 during the boot phase. For example, a set of runtime services can be presented to ensure appropriate abstraction of base platform hardware resources used by the operating system 502 during its operation. UEFI allows extension of platform firmware by loading UEFI driver and UEFI application images which, when loaded, have access to UEFI-defined runtime and boot services.

Additional details regarding the operation and architecture of a UEFI Specification compliant firmware can be found in the UEFI Specification which is available from INTEL CORPORATION. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 6:
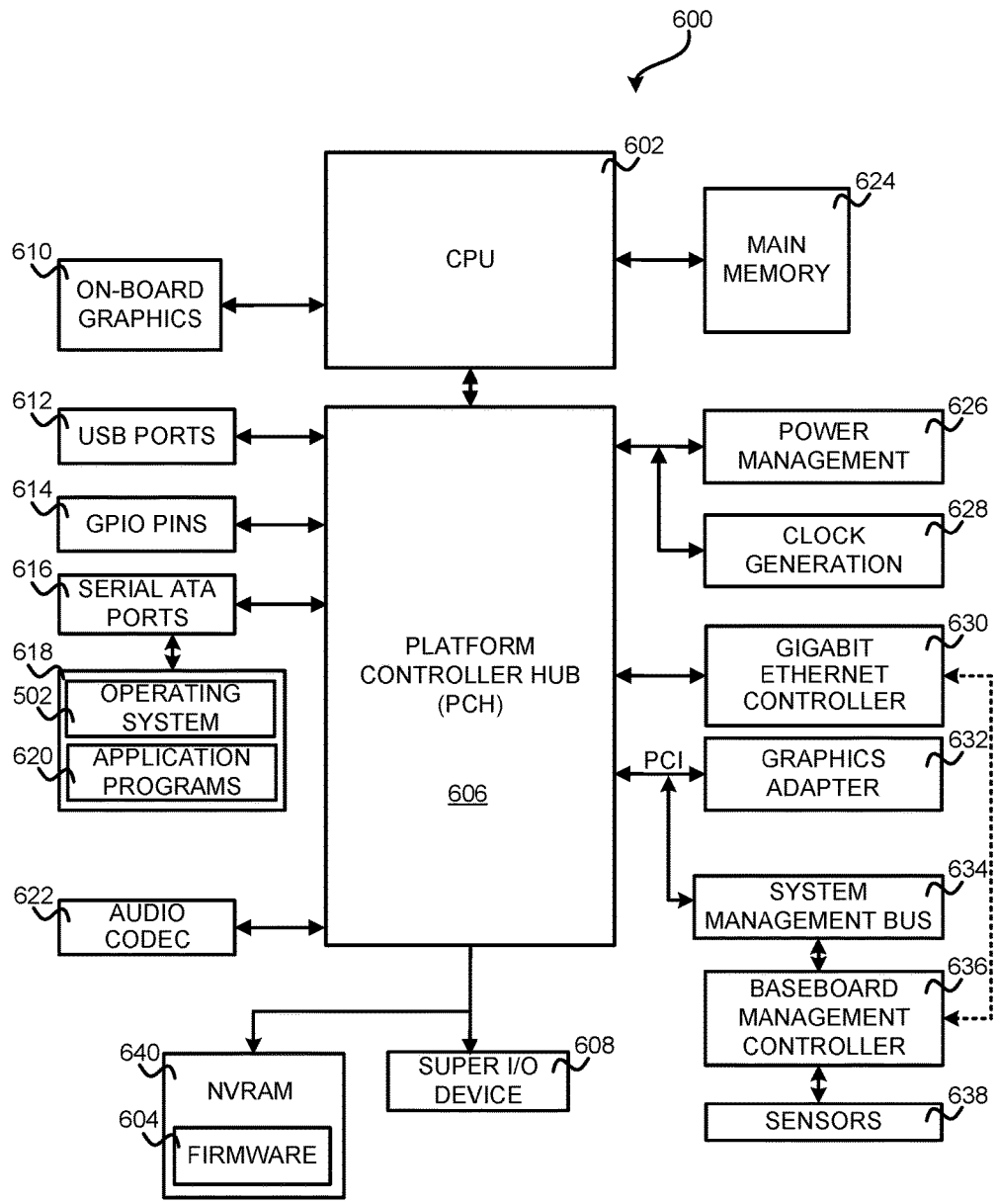
FIG. 6 is a computer architecture diagram that shows an illustrative architecture for a computer that can provide an operating environment for the technologies disclosed herein.

Referring now to FIG. 6, a computer architecture diagram that illustrates an illustrative architecture for a computer that can provide an illustrative operative environment for the technologies presented herein will be described. FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can be utilized in the implementations described herein. The illustrative computer architecture shown in FIG. 6 is for the computer 600 that includes a baseboard, or "motherboard", which is a printed circuit board to which a multitude of components or devices can be connected by way of a system bus or other electrical communication path. In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a random access memory ("RAM") used as the main memory 624 in the computer 600 and, possibly, to an on-board graphics adapter 632. The PCH 606 provides an interface between the CPU 602 and the remainder of the computer 600.

The PCH 606 can also be responsible for controlling many of the input/output functions of the computer 600. In particular, the PCH 606 can provide one or more universal serial bus ("USB") ports 612, an audio codec 622, a Gigabit Ethernet Controller 630, and one or more general purpose input/output ("GPIO") pins 614. The USB ports 612 can include USB 2.0 ports, USB 3.0 ports and USB 3.1 ports among other USB ports. The audio codec 622 can include Intel High Definition Audio, Audio Codec '97 ("AC '97") and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to a configuration, the PCH 606 includes a serial advanced technology attachment ("SATA") adapter for providing one or more serial ATA ports 616. The serial ATA ports 616 can be connected to one or more mass storage devices storing an OS, such as OS 502 and application programs, such as a SATA disk drive 618. As known to those skilled in the art, an OS comprises a set of programs that control operations of a computer and allocation of resources. An application program is software that runs on top of the operating system software 502, or other runtime environment, and uses computer resources to perform application specific tasks desired by the user.

According to one configuration, the OS 502 comprises the LINUX operating system. According to another configuration, the OS 502 comprises the WINDOWS operating system from MICROSOFT CORPORATION. According to another configuration, the OS 502 comprises the UNIX operating system. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 600.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 600.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 640 for storing firmware 604 that includes program code containing the basic routines that help to start up the computer 600 and to transfer information between elements within the computer 600.

It should be appreciated that the program modules disclosed herein, including the firmware 604, can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 624 and/or NVRAM 640. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 606 can include a system management bus 634. The system management bus 634 can include a Baseboard Management Controller ("BMC") 636. In general, the BMC 636 is a microcontroller that monitors operation of the computer 600. In a more specific configuration, the BMC 636 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, the BMC 636 is communicatively connected to one or more components by way of the system management bus 634.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 636 functions as the master on the system management bus 634 in most circumstances, but can also function as either a master or a slave in other circumstances. Each of the various components communicatively connected to the BMC 636 by way of the system management bus 634 is addressed using a slave address. The system management bus 634 is used by the BMC 636 to request and/or receive various operating and performance-related parameters from one or more components, which are also communicatively connected to the system management bus 634.

It should be appreciated that the functionality provided by the computer 600 can be provided by other types of computing devices, including hand-held computers, embedded computer systems, personal digital assistants, and other types of computing devices known to those skilled in the art. It is also contemplated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for firmware debug trace capture have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer system comprising:
a motherboard that does not include an operative serial communications port, the motherboard comprising:
a first processor,
a first Serial Peripheral Interface ("SPI") device, and
a first firmware storing first instructions that when executed by the first processor cause the first processor to:
capture debug trace statements from code within the first firmware during a boot cycle of the computer system,
encode the debug trace statements into a first data format to generate encoded debug trace statements for transmission by the first SPI device, and
write the encoded debug trace statements in the first data format to the first SPI device; and
a microcontroller comprising:
a second processor,
a second SPI device,
at least one serial communications port, and
a second firmware storing second instructions that when executed by the second processor cause the second processor to:
capture the encoded debug trace statements in the first data format from the first SPI device,
convert the encoded debug trace statements from the first data format into a second data format to generate converted debug trace statements for transmission by the at least one serial communications port, and
transmit the converted debug trace statements in the second data format over the at least one serial communications port.

2. The computer system of claim 1 wherein the first SPI device is a master device.

3. The computer system of claim 1 wherein the second SPI device is a slave device.

4. The computer system of claim 1 wherein the encoded debug trace statements in the first data format are captured on a master output slave input ("MOSI") pin of the second SPI device.

5. The computer system of claim 1 wherein the debug trace statements include information regarding a pre-Extensible Firmware Interface initialization ("PEI") phase of the boot cycle of the computer system.

6. The computer system of claim 1 wherein the debug trace statements include information regarding a driver execution ("DXE") phase of the boot cycle of the computer system.

7. The computer system of claim 1 wherein the second data format is American Standard Code for Information Interchange ("ASCII").

8. The computer system of claim 1 wherein the second data format is little endian.

9. The computer system of claim 1 wherein the first data format is big endian.

10. A computer-implemented method comprising:
causing at least one processor to execute a firmware installed on a motherboard of a computer to perform a boot cycle of the computer, wherein the motherboard of the computer does not include an operative serial communications port;
capturing, during the boot cycle, debug trace statements from the firmware;
encoding the debug trace statements into a first data format to generate encoded debug trace statements;
loading the encoded debug trace statements to a shift register of a Serial Peripheral Interface ("SPI") device installed on the motherboard; and
transmitting the encoded debug trace statements via the SPI device.

11. The computer-implemented method of claim 10 wherein the SPI device is a master device.

12. The computer-implemented method of claim 10 wherein the encoded debug trace statements in the first data format are transmitted on a master output slave input ("MOSI") pin of the SPI device.

13. The computer-implemented method of claim 10 wherein the debug trace statements include information regarding a pre-Extensible Firmware Interface initialization ("PEI") phase of the boot cycle of the computer.

14. The computer-implemented method of claim 10 wherein the debug trace statements include information regarding a driver execution ("DXE") phase of the boot cycle of the computer.

15. The computer-implemented method of claim 10 wherein the first data format is big endian format.

16. A computer-implemented method comprising:
- capturing, from a first Serial Peripheral Interface ("SPI") device of a computer, debug trace statements that are generated during a boot cycle of the computer, wherein the capturing the debug trace statements occurs via a master output slave input ("MOSI") pin of a second Serial Peripheral Interface ("SPI") device,
- transforming the debug trace statements from a first data format into a second data format that is suitable for transmission over a serial communications port, wherein the first data format is different than the second data format; and
- transmitting the debug trace statements via the serial communications port in the second data format.

17. The computer-implemented method of claim 16 wherein the second SPI device is a slave device.

18. The computer-implemented method of claim 16 wherein the debug trace statements include information regarding a pre-Extensible Firmware Interface initialization ("PEI") phase of a boot cycle of a computer.

19. The computer-implemented method of claim 16 wherein the debug trace statements include information regarding a driver execution ("DXE") phase of the boot cycle of a computer.

20. The computer-implemented method of claim 16 wherein the transforming the debug trace statements from the first data format into the second data format that is suitable for transmission over the serial communications port includes at least transforming big endian format to little endian format.

\* \* \* \* \*